CHARLES DU LIN, OF MANS, FRANCE.

Letters Patent No. 87,650, dated March 9, 1869.

IMPROVEMENT IN THE MANUFACTURE OF ARTIFICIAL FUEL.

The Schedule referred to in these Letters Patent and making part of the same.

*To all whom it may concern:*

Be it known that I, CHARLES DU LIN, of Mans, France, have invented a new and improved Method of Agglomerating Small Coals, and Dust of Coals, Coke, Charcoal, Wood, &c., by means of vegetable resinous substances generally, and especially of those proceeding from sea-pine; and I hereby declare the following to be a full, clear, and exact description of the same.

It is well known that in coal-mines, the dust of coal is of no value whatever. Endeavors were long ago made to employ the same by forming it into a body, in order to be able to burn it on gratings as large coals are burned. Such was the origin of the idea of agglomerated coals, which were manufactured, in the beginning, at Givon, in France, and were used, later, in Belgium, England, and Prussia.

The method of manufacturing such coals generally consists in the mixture of the small coals and dust, when heated, with from seven to eight per cent. of coal-tar, or even with the residuum of the distillation of tar, under a temperature moderately high, the mass being afterward moulded or formed into bricks or cakes of various shapes, which are then submitted to strong pressure. Sometimes these bricks are cooked under a dark red heat, being thus rendered harder; sometimes they are sold uncooked.

By washing the said small coals, and thus getting rid of the other stuffs which they contain, (ten to fifteen per cent.,) which are very injurious to their combustion, the manufactured product is improved in quality.

This agglomerated product, though valued now the same as coal, has, however, many serious inconveniences. The bricks or cakes crumble when burning, and they resist but indifferently the shocks to which they are subjected in transportation.

The most various, and sometimes most inappropriate matters, have been employed as agglomerators, in order to procure for the cakes such solidity as is necessary, but without success.

After many inconclusive experiments, I employed, as agglomerating-matter, the rosin of sea-pine, and immediately obtained very satisfactory results, even without subjecting the mass to any pressure, and simply by the settling or setting together of the ingredients. Agglomerated coals thus made resist shocks equally as well as natural coal, and when inflamed, burn like fat free-burning coals, which are the best for the grating. Their fracture is entirely similar to that of coal.

My method of manufacturing them is not very different from that generally in use, and which I have above briefly described.

I mix the dust and small coal, when heated, with five per cent. of vegetable rosin, and then shape or mould the mass into the form of bricks or loaves.

These bricks, being but slightly pressed, or only piled up, possess on being dried a remarkable hardness, caused by the crystallization of the rosin, and by the affinity between the matters to be agglomerated and the agglomerating-substance.

By submitting this agglomerated coal to more or less pressure, the proportion of rosin can be lowered from about one to two per cent., and I reserve to myself the right to increase or decrease the proportions of rosin to be employed, according to the kind of substance to be agglomerated, and also to the use to be made of the agglomerated matters.

In addition to the above-mentioned advantages, this agglomerated material possesses a heating-power, or caloric, superior to that of coal, which arises from the rosin therein contained, which is well known to be very rich in hydrogen and carbon, and consequently is favorable to the combustion of coal-gases, and especially of carbonic-acid gas.

The use of rosin for the purpose of agglomeration will be found especially convenient and useful for anthracite, whose great density, and want of bitumen, hinder it from burning, and for glance-coal, and for coke, which burn with difficulty, and without flame.

It is known that coal cannot be used for working blast-furnaces, on account of its fusibility and large proportion of sulphur. For the working of iron, manufacturers generally make use of coke, which also heats better and more continuously than any other fuel. But the use of coke, also, is attended with inconvenience; that is to say, it is porous, of a swollen and even hollow structure, and it is important to cause such inconvenience to disappear. Indeed, in spite of its great density, it is comparatively light on account of its volume, and under the influence of the hot and compressed air coming from the tuyeres, it often causes excavations in the red mass at the neck of the hearth, which are injurious to the smelting-process.

Dust and small coals, agglomerated by means of vegetable rosin, and submitted to a slight pressure, constitute a solid, and compact, and very dense body, which acts, when burning, in the same manner as the best charcoal.

Moreover, the well-known effects of rosin on smelting-metals, when burning with them, render it probable that it may neutralize the influence of sulphur, phosphorus, &c., so highly injurious to the quality of pig-iron.

I also contemplate forming a cover of clay and thin coal-dust over my agglomerated bricks, or of covering them otherwise, in order to prevent their sticking together under the influence of heat.

It is well known that the requirements of gas-manufacture are—

First, to produce illuminating and non-illuminating elements in such proportions that the gas may be completely burned, without giving any smoke or disagreeable smell, and further, so that the amount of gas necessary for the production of a certain quantity of light, may not be excessive.

Second, to obtain from a given weight of certain substances, the largest proportion possible of gaseous-lighting bodies.

Third, to produce as much hydrogen as possible, at the expense of the protocarburet of hydrogen and oxide of carbon, so as to the less vitiate the air of the rooms where the combustion of the gas takes place.

Now, the constituent elements of refined coal-gas are hydrogen, protocarburet of hydrogen, carbonic oxide, bicarburet of hydrogen, and other illuminating-gases, formed by an equal number of atoms of hydrogen and carbon, lastly, vapors of hydrocarburets, in which the atoms of carbon are more numerous than those of hydrogen, such as benzine, &c. It contains also small quantities of nitrogen, oxygen, and vapors of carburet of sulphur.

Hydrogen, protocarburet of hydrogen, and carbonic oxide, have no illuminating-power. The illuminating-power of coal-gas is produced by the bicarburet of hydrogen, and by the hydrocarburets which accompany it.

The elements of illuminating coal-gas must be combined with one at least of the non-illuminating bodies, otherwise the combustion of the hydrocarburets could take place only with difficulty. Among these bodies, hydrogen is the gas to be preferred.

It is also well known that rosins are very rich in carbon and hydrogen. When decomposing them by heat, many carburets of hydrogen, both solid, liquid, and gaseous, are obtained. They are bodies containing oxygen, but carbon and hydrogen prevail in their elementary composition. In the beginning, when they are submitted to dry distillation, they give carburetted gases, which burn with a very brilliant flame.

On account of all these reasons, the employment of my agglomerated coal presents very great advantages in the manufacture of illuminating-gas, not only as respects the production of gas, but also of coke, because rosin being mixed with the coal, gives a hard coke, leaving very few ashes when burned.

It is also known that smith free-burning coals are preferred for making gas, but that the said coals are liable to constant deterioration. In the open air, *in vacuo*, under pressure or not, they always evolve either protocarburet of hydrogen or nitrogen and carbonic acid; and the fatty principle, which facilitates the fermentation of coke, becomes so much altered that those coals, on remaining some months exposed to air, become unfitted for use.

Rosin being present in our agglomerated coals, they are not liable to this inconvenience, and it is plain that if the free-burning coals above named are dosed or agglomerated with rosin, the same results will be obtained.

On the other hand, uninflammable coals are generally disused, because they give little gas; and, further, their coke does not agglomerate easily. These coals being suitably treated with vegetable rosin, will become perfectly capable of being employed in gas-manufacture.

I contemplate manufacturing fuel of this nature, by mixing the vegetable rosin, not only with coal-dust or small pieces of coal, but with any charcoal, coke, peat, sawdust, or other woody particles, and other vegetable substances suited for the purpose.

What, therefore, I claim as my invention, and desire to secure by Letters Patent, is—

1. The method of agglomerating small coals, the dust of coals, charcoal, coke, wood, and other substances, as specified, by the employment of vegetable resins, and especially those proceeding from sea-pine, mixed with said substances, substantially as and for the purposes specified.

2. As a new article of manufacture, the agglomerated coals or fuel, produced substantially in the manner, and by the employment of the ingredients, as herein specified.

3. The employment, in the manufacture of illuminating-gas, of free-burning or uninflammable coals, mingled with more or less vegetable rosin, substantially as and for the purposes herein set forth.

BON. CHARLES DU LIN.

Witnesses:
F. OLCOTT,
P. VENONI, *Paris*.